United States Patent
Fukushima et al.

(10) Patent No.: US 7,353,193 B2
(45) Date of Patent: Apr. 1, 2008

(54) FUEL DELIVERY SYSTEM OF MACHINE, FUEL DELIVERY METHOD AND FUEL DELIVERY PROGRAM OF THE SAME

(75) Inventors: Hidetada Fukushima, Oyama (JP); Yutaka Kamada, Himeji (JP); Takao Nagai, Yokohama (JP)

(73) Assignee: Komatsu, Ltd., Tokyo (JP)

( * ) Notice: Subject to any disclaimer, the term of this patent is extended or adjusted under 35 U.S.C. 154(b) by 690 days.

(21) Appl. No.: 10/254,930

(22) Filed: Sep. 26, 2002

(65) Prior Publication Data

US 2003/0065570 A1 Apr. 3, 2003

(51) Int. Cl.
*G06Q 10/00* (2006.01)

(52) U.S. Cl. ............... 705/28; 705/1; 700/9; 700/240; 700/283

(58) Field of Classification Search ............ 705/28, 705/22
See application file for complete search history.

(56) References Cited

U.S. PATENT DOCUMENTS

| | | | | |
|---|---|---|---|---|
| 4,658,371 A | * | 4/1987 | Walsh et al. | 700/283 |
| 5,579,233 A | * | 11/1996 | Burns | 700/240 |
| 5,928,291 A | * | 7/1999 | Jenkins et al. | 701/1 |
| 5,983,198 A | * | 11/1999 | Mowery et al. | 705/22 |
| 6,154,658 A | * | 11/2000 | Caci | 455/466 |
| 6,481,627 B1 | * | 11/2002 | Guerreri | 235/472.01 |
| 6,484,088 B1 | * | 11/2002 | Reimer | 701/123 |
| 2003/0149491 A1 | * | 8/2003 | Adachi et al. | 700/9 |

FOREIGN PATENT DOCUMENTS

| | | |
|---|---|---|
| JP | 2001-266200 | 9/1991 |
| JP | H5-85596 | 4/1993 |
| JP | 10078867 | 4/1998 |
| JP | 10188194 | 7/1998 |
| JP | 2001-227997 | 8/2001 |

* cited by examiner

*Primary Examiner*—Ryan M. Zeender
*Assistant Examiner*—Asfand M Sheikh
(74) *Attorney, Agent, or Firm*—Posz Law Group, PLC; R. Eugene Varndell

(57) ABSTRACT

A fuel delivery system of a machine capable of efficiently feeding fuel, where a time of feeding fuel to a construction machine is estimated based on operation information of the construction machine. Based on position information of the construction machine acquired by position information acquiring means and estimated time of feeding fuel, a delivery schedule, which has a short moving distance and capable of delivering and feeding fuel efficiently in a short period of time, is formed. The delivery schedule is notified to a controller of the construction machine. The delivery schedule is reconstructed by a set input of a change in the delivery schedule from the controller. A specified form for requesting expense of feeding fuel is automatically formed from a fuel feeding amount after fuel has been delivered and fed by the formed delivery schedule and confirming to feed fuel.

15 Claims, 13 Drawing Sheets

FIG. 6

POSITION INFORMATION DATABASE — 34

| MACHINE NUMBER | UPDATED DATE | UPDATED TIME | POSITION INFORMATION | |
|---|---|---|---|---|
| | | | LATITUDE | LONGITUDE |
| A0001 | 01/07/01 | 17:00 | N35/41/05 | E139/40/11 |
| A0002 | 01/07/02 | 17:30 | N35/38/10 | E137/35/15 |
| B0001 | 01/07/03 | 17:00 | N35/37/18 | E135/44/30 |
| ...... | ...... | ...... | ...... | ...... |
| ...... | ...... | ...... | ...... | ...... |
| ...... | ...... | ...... | ...... | ...... |

MACHINE NUMBER: A0001

| ACQUIRED DATE (351) | ACQUIRED TIME (352) | FUEL REMAINING AMOUNT (%) (353) |
|---|---|---|
| 01/07/01 | 17:00 | 80 |
| 01/07/02 | 17:30 | 50 |
| 01/07/03 | 17:00 | 20 |
| ...... | ...... | ...... |
| ...... | ...... | ...... |
| ...... | ...... | ...... |

FIG. 9

ROLLEY NUMBER: R0001

| SUPPLY OBJECT | CIRCULATING DATE | SUPPLY START TIME | SUPPLY FINISH TIME | FUEL KIND | ROLLY REMAINING AMOUNT | SUPPLY AMOUNT | |
|---|---|---|---|---|---|---|---|
| | | | | | | TANK REMAINING AMOUNT | SUPPLY AMOUNT |
| LOADED WITH LIGHT OIL | 2001/7/1 | 8:30 | — | | 200 | — | — |
| A0001 | 01/07/01 | 9:30 | 9:40 | LIGHT OIL | 1820 | 20 | 180 |
| A0002 | 01/07/01 | 10:30 | 10:40 | LIGHT OIL | 1670 | 60 | 150 |
| B0001 | 01/07/01 | 11:30 | 11:40 | LIGHT OIL | 1530 | 60 | 140 |
| ...... | ...... | ...... | ...... | ...... | ...... | ...... | ...... |
| ...... | ...... | ...... | ...... | ...... | ...... | ...... | ...... |

371 372 373

37

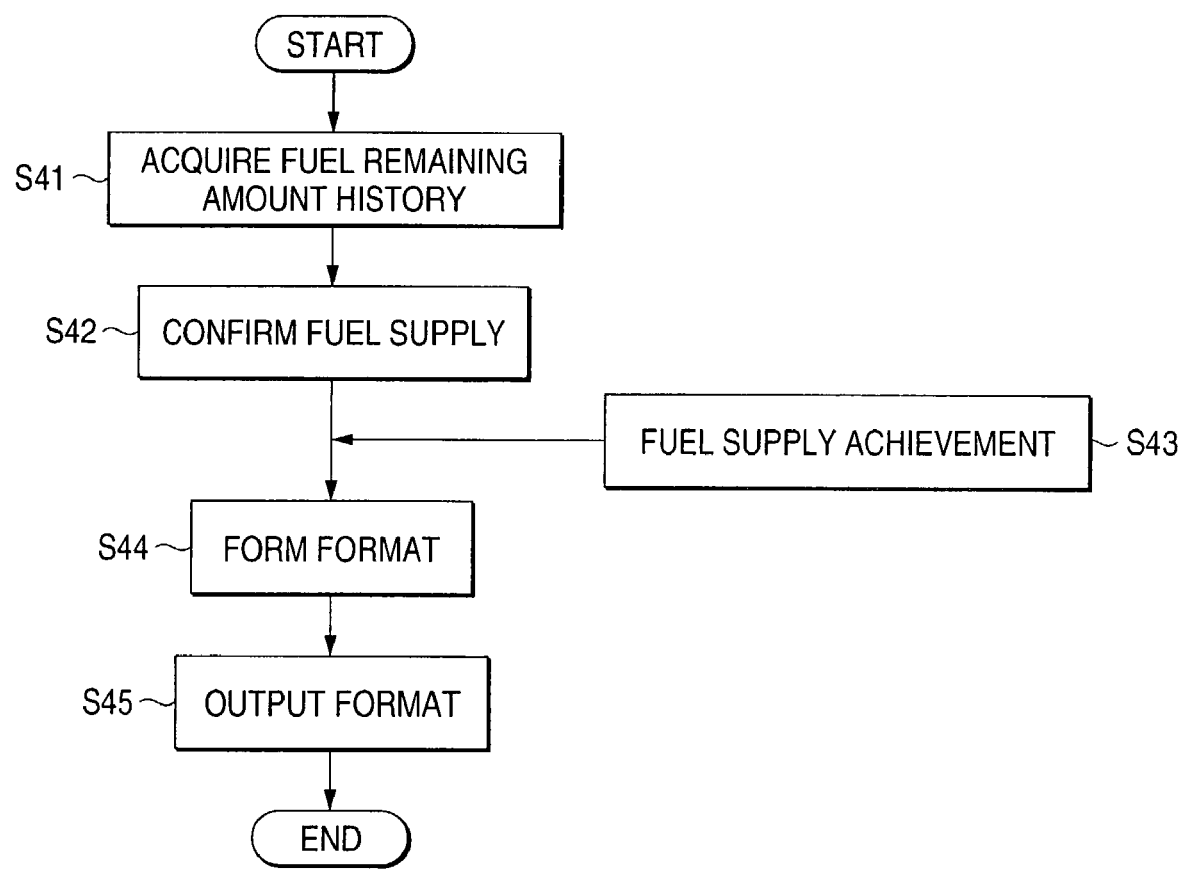

FUEL DELIVERY SYSTEM OF MACHINE, FUEL DELIVERY METHOD AND FUEL DELIVERY PROGRAM OF THE SAME

BACKGROUND OF THE INVENTION

1. Field of the Invention

The present invention relates to a fuel delivery system of a machine, a fuel delivery method of the same and a fuel delivery program of the same for forming a delivery schedule for feeding fuel used by operating a machine and is particularly preferable in forming a delivery schedule for feeding fuel to a construction machine.

2. Description of the Related Art

For example, in the case of carrying out construction by operating a construction machine, the construction is progressed efficiently by ensuring fuel supplied to the construction machine. Ensuring of fuel in the construction significantly influences on the situation of progressing the construction. Particularly, when a number of construction machines are used, it is extremely important to ensure fuel for the number of construction machines. Further, in order to assure a supply of fuel, normally, a fuel delivery and feeding service from nearby exclusive fuel stores or fuel supply stores is normally requested.

However, in the case of a mobile type construction machines, a location of operating the construction machine may not be fixed and the amount of fuel consumption varies significantly depending on operation time or operation condition per day. For such reasons, fuel is supplied in excess before the fuel on hand is exhausted, and therefore, there poses a problem that the delivery and feeding service of fuel cannot be received efficiently.

SUMMARY OF THE INVENTION

In view of such a point, it is an object of the invention to provide a fuel delivery system of a machine, a fuel delivery method of the same and a fuel delivery program of the same capable of feeding fuel efficiently to a machine.

The invention adopts the following constitution in order to achieve the above-described object.

According to a first aspect of a fuel delivery system of a machine, there is provided a fuel delivery system of a machine for forming a delivery schedule for feeding fuel for operating a machine. The fuel delivery system can comprise position information acquiring means for acquiring position information of the machine, operation information acquiring means for acquiring operation information of the machine, fuel remaining amount information acquiring means for acquiring remaining amount information of the fuel of the machine, fuel feeding time estimating means for estimating fuel feeding time of the fuel of the machine based on the operation information acquired by the operation information acquiring means and the remaining amount information of the fuel acquired by the fuel remaining amount information acquiring means, and delivery schedule forming means for forming the delivery schedule for delivering the fuel based on the fuel feeding time acquired by the fuel feeding time estimating means and the position information acquired by the position information acquiring means.

According to the aspect of the invention, the fuel feeding time of the fuel of the machine is estimated by the fuel feeding time estimating means based on the operation information acquired by the operation information acquiring means and the remaining amount information of the fuel acquired by the fuel remaining amount information acquiring means and the delivery schedule is formed for delivering the fuel by the delivery schedule forming means based on the fuel feeding time provided by the fuel feeding time estimating means and the position information acquired by the position information acquiring means. Therefore, the time of feeding the fuel to the machine can be automatically determined for any position obtained by the position information acquired previously by the position information acquiring means in accordance with an operating situation and the fuel can be supplied to the machine efficiently.

According to a second aspect of the invention, in the fuel delivery system of a machine according to the first aspect of the invention, the delivery schedule forming means forms a delivery route shortening a moving distance and constituting a short time period for delivering the fuel.

According to the aspect of the invention, the delivery route shortening the moving distance for delivering the fuel and constituting the short time period is formed by the delivery schedule forming means. Therefore, even when the fuel is delivered to a plurality of machines operating at, for example different locations, the fuel can be delivered efficiently.

According to a third aspect of the invention, in the fuel delivery system of a machine according to the first or the second aspect of the invention, the delivery schedule forming means forms the delivery schedule by acquiring fuel feeding request information from an operator or a controller controlling the machine.

According to the aspect of the invention, the delivery schedule is formed by the delivery schedule forming means by acquiring the fuel feeding request information from the operator controlling the machine and therefore, other than automatic delivery of the fuel based on the operational situation of the machine, the fuel remaining amount and the position, the fuel feeding request from the operator controlling the machine can be met, a performance of dealing with delivery of the fuel can be promoted and general purpose performance can be promoted.

According to a fourth aspect of the invention, in the fuel delivery system of a machine according to any one of the first through the third aspects, there is further provided fuel feeding information distributing means for distributing the delivery schedule of the fuel to the operator of the machine.

According to the aspect of the invention, the delivery schedule of the fuel is distributed to the operator of the machine by the fuel feeding information distributing means. Therefore, the delivery time for supplying the fuel can previously be notified to the controller and the fuel can be fed smoothly.

According to a fifth aspect of the invention, in the fuel delivery system of a machine according to the fourth aspect of the invention, the fuel feeding information distributing means distributes delivery information having a content enabling or expediting the controller to input an acknowledgement or a request to change the delivery schedule of the fuel to the controller via a wireless medium, and the delivery schedule forming means recognizes the content input by the operator as the fuel feeding request information via a wireless medium.

According to the aspect of the invention the delivery information, having the content enabling or expediting the operator to input an acknowledgement or a request to change the delivery schedule of the fuel, is distributed to the operator by the fuel feeding information distributing means via the wireless medium and the content inputted by the operator is recognized as the fuel feeding request information by the delivery schedule forming means via the wireless medium. Therefore, the acknowledgement or the request to the change the delivery schedule is confirmed by notifying the delivery schedule to the operator of the machine via the wireless medium, and therefore, delivery of the fuel can be confirmed without a time difference.

According to a sixth aspect of the invention, in the fuel delivery system of a machine according to the fourth or the fifth aspect of the invention, the delivery schedule forming means reconstructs the delivery schedule based on the fuel feeding request information from the operator recognizing the delivery schedule.

According to the aspect of the invention, the delivery schedule is reconstructed based on the fuel feeding request information from the operator recognizing the delivery schedule by the delivery schedule forming means. Therefore, the fuel can be delivered and fed efficiently in correspondence with a convenience of the fuel feeding time such that the fuel is delivered for feeding the fuel in conformity with, for example, nonoperational time of the machine.

According to a seventh aspect of the invention, in the fuel delivery system of a machine according to any one of the first through the sixth aspects of the invention, there are further provided fed fuel information acquiring means for acquiring fed fuel information with regard to feeding the fuel from the machine constituting an object to be fed with the fuel, and fuel feeding information acquiring means for acquiring fuel feeding information with regard to feeding the fuel to the machine, wherein the delivery schedule forming means recognizes a fuel feeding amount and a fuel price of the fuel by checking the fed fuel information acquired by the fed fuel information acquiring means with the fuel feeding information acquired by the fuel feeding information acquiring means and forms a specified form for requesting an expense produced by feeding the fuel based on the fuel feeding amount and the fuel price of the fuel.

According to the aspect of the invention, the fuel feeding amount of the fuel and the fuel price are recognized by checking the fed fuel information acquired by the fed fuel information acquiring means with the fuel feeding information acquired by the fuel feeding information acquiring means and the specified form for requesting the expense produced by feeding the fuel is formed based on the fuel feeding amount of the fuel and the fuel price as the delivery schedule forming means by the delivery schedule forming means. Therefore, the specified form for requesting the expense of the fuel fed based on the fed fuel information and the fuel feeding information is automatically formed and therefore, operation of requesting the expense of the fed fuel can be simplified.

The fuel delivery method of a machine according to an eighth aspect of the invention, develops the fuel delivery system of a machine according to the first aspect of the invention as the fuel delivery method, the position information and the operation information of the machine and the remaining amount information of the fuel are acquired by a computer, the fuel feeding time of the fuel of the machine is estimated by the computer based on the operation information and the remaining amount information of the fuel, the delivery schedule for delivering the fuel is formed based on the fuel feeding time and the position information and therefore, operation and effect similar to those of the first aspect of the invention can be enjoyed.

According to a ninth aspect through a fourteenth aspect of the invention, in the fuel delivery method of a machine according to the eighth aspect of the invention, by the fuel delivery method of a machine in correspondence with the fuel delivery system of a machine according to the second through the seventh aspect of the invention, operation and effect similar to those of the second through the seventh aspect of the invention can be enjoyed.

According to a fifteenth aspect of the invention, the fuel delivery method of a machine according to the eighth aspect through the fourteenth aspect of the invention is executed by a computer.

According to the aspect of the invention, by utilizing, for example, a general purpose computer and installing the computer, the fuel delivery method of a machine according to the eighth aspect through the fourteenth aspect can be made to be executed by the computer and the invention can considerably be promoted to utilize.

Further, according to the eighth through the fourteenth aspects of the invention and the fifteenth aspect of the invention, a number of the computer is not limited to a single one but, for example, the invention includes also a constitution of combining a plurality of computers in a network.

BRIEF DESCRIPTION OF THE DRAWINGS

FIG. 6 is a schematic view showing a structure of a data base accumulating acquired position information of a construction machine according to the embodiment;

FIG. 7 is a schematic view showing a structure of a data base accumulating an acquired remaining amount of fuel of a construction machine according to the embodiment;

FIG. 9 is a schematic view showing a structure of a data base accumulating acquired achievement information of a tank trolley according to the embodiment;

FIG. 14 is a flowchart for explaining operation of the embodiment.

DETAILED DESCRIPTION OF THE PREFERRED EMBODIMENT

An explanation will be given of an embodiment of the invention in reference to the drawings as follows.

(System Constitution)

Figure 1:
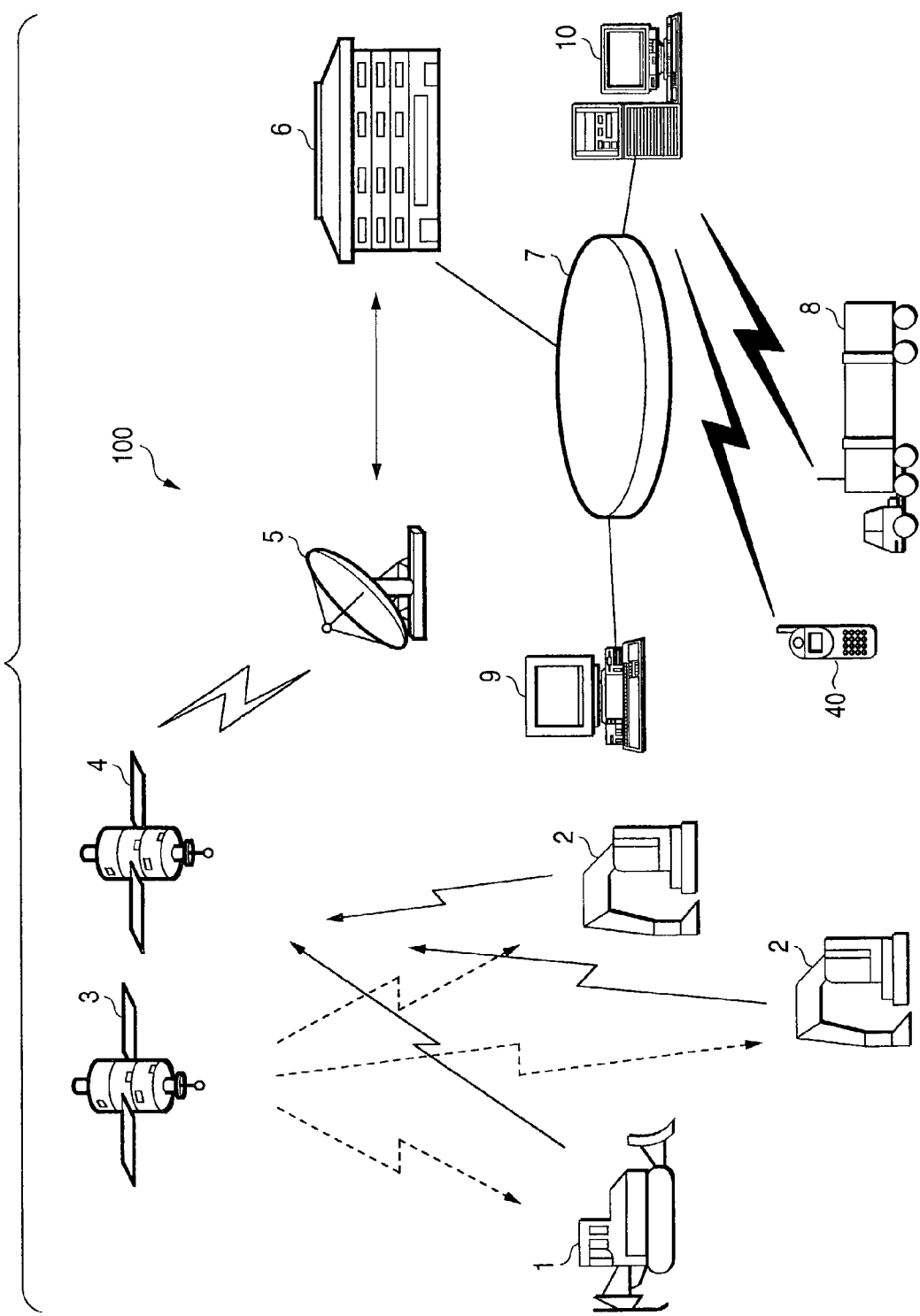
FIG. 1 is a schematic view showing a constitution of a fuel delivery system of a machine according to an embodiment of the invention.

FIG. 1 is a schematic view showing an outline constitution of a fuel delivery system of a machine according to the embodiment. A fuel delivery system 100 is provided with a plurality of construction machines 1, 2; 1, 2 a GPS (Global Positioning System) satellite 3; a communication satellite 4; a satellite earth station 5; a network control station 6, a network 7; a tank trolley or tank trolley 8 and a server 10. The fuel delivery system 100 acquires position information, a fuel remaining amount, machine information including machine number which is machine identifying information and operation information outputted from the construction machine 1, 2 by the server 10 and in accordance with the fuel remaining amount of the construction machine 1, 2, light oil which is fuel is supplied and circulated by the tank trolley 8. Further, the fuel delivery system 100 acquires a date of feeding light oil by the tank trolley 8, fuel enterprise specifying information for specifying an enterprise selling fuel to be supplied and fuel feeding achievement including an amount of supplying fed fuel by the server 10. Further, the fuel delivery system 100 is a system for forming a delivery schedule for feeding light oil which is fuel to the construction machine 1, 2 based on acquired respective information.

The construction machine 1, 2 is a machine for carrying out operation of drilling, ground leveling or piling at a construction site which is a predetermined area. As the construction machine 1, 2, for example, a bulldozer 1 or a power shovel 2 corresponds thereto.

Figure 2:
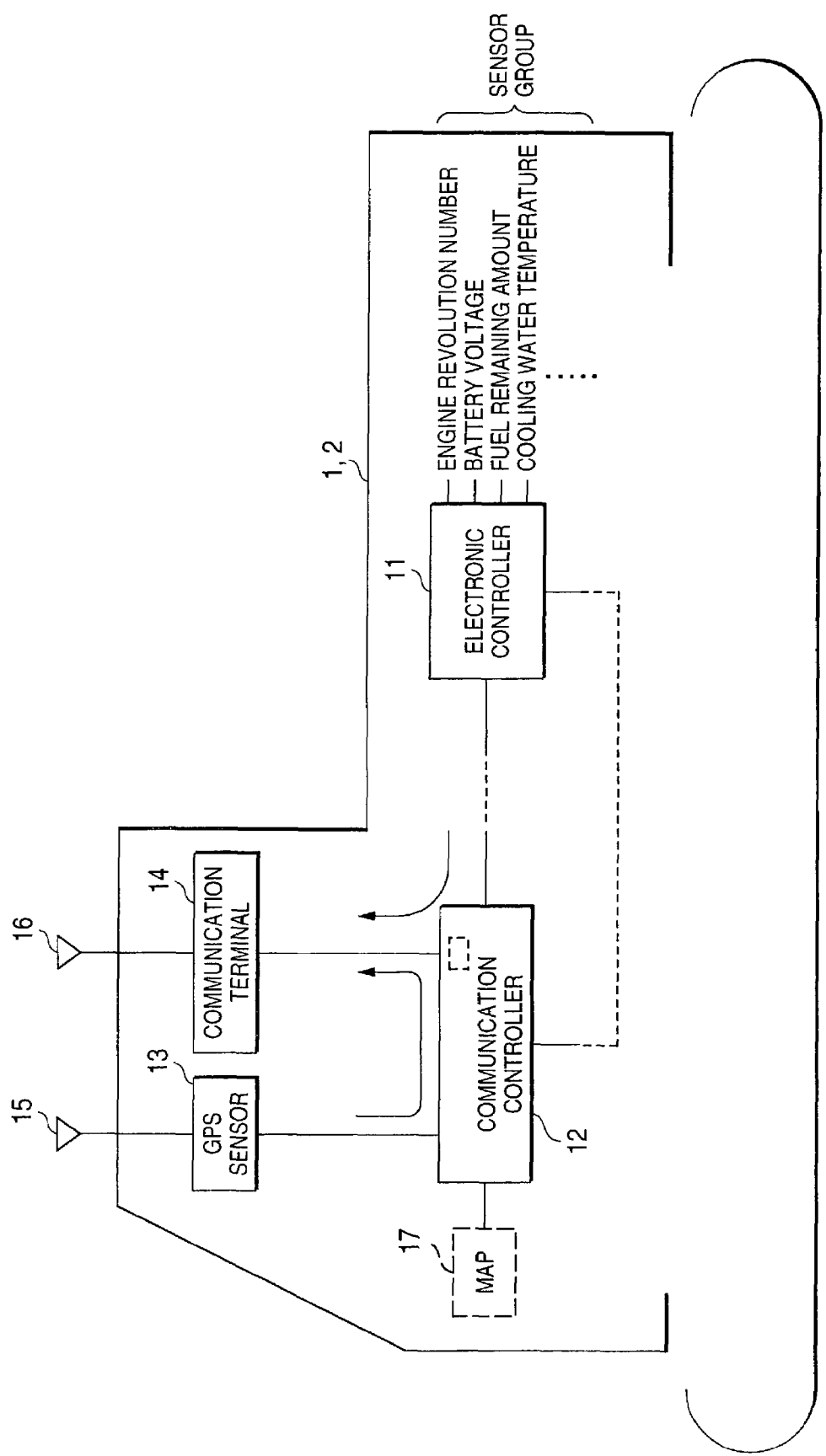
FIG. 2 is a block diagram showing a structure of machine information outputting means mounted to a construction machine according to the embodiment.

As shown by FIG. 2, the construction machine 1, 2 is provided with an electronic controller 11 for electronically controlling a drive portion, a communication controller 12 connected to the electronic controller 11, a GPS sensor 13 and a communication terminal 14 connected to the communication controller 12, a GPS antenna 15 connected to the GPS sensor 13 and a satellite communication antenna 16 connected to the communication terminal 14.

The electronic controller 11 receives signals from various sensors for detecting an operational state constituting elements for driving the construction machine 1, 2 such as a rotational number of an engine, not illustrated, mounted to the construction machine 1, 2, voltage of a battery, a remaining amount of light oil as fuel, water temperature of cooling water, and an operating time period and electronically controls the elements.

The communication controller 12 is a portion of acquiring machine information of the construction machine 1, 2 from states of the construction machine 1, 2 of respective drive portions detected by the electronic controller 11. Specifically, the communication controller 12 can acquire the fuel remaining amount and operation information of the construction machine 1, 2. Further, the communication controller 12 includes a storage area at inside thereof. The storage area is stored with information of an owner of each construction machine 1, 2, a machine number of each construction machine 1, 2; per se including machine identifying information and/or summed-up operation time period.

The GPS sensor 13 receives radio wave outputted from a plurality of the GPS satellites 3 via the GPS antenna 15 and measures its current position of based on a state of received radio waves. The current position information of the construction machine 1, 2 acquired by the GPS sensor 13, is outputted to the communication controller 12. Further, the current position information acquired by the GPS sensor 13 can be displayed as a map on an image display apparatus 17 of a navigation system by combining with a map data base, not illustrated.

In this way, the machine information of the construction machine 1, 2 acquired by the communication controller 12 is outputted from the satellite communication antenna 16 via the communication terminal 14 and is outputted to the server 10 via the communication satellite 4, the satellite earth station 5, the network control station 6 and the network 7. Machine information outputting means is constituted by the communication controller 12 and the communication terminal 14. Further, although the machine information by the communication controller 12 and the communication terminal 14 can be outputted by wireless communication at arbitrary time and interval, it is normally preferable to output the information at any of time of starting operation at a construction site, a break time and time of finishing operation.

The network 7 is constituted as an internet based on general purpose protocol such as TCP/IP. The network 7 is connected with the network control station 6, the server 10 as well as a terminal computer 9 installed at a control office of a construction site. The terminal computer 9 is a general purpose computer including a computer main body comprising an operational processing apparatus and a storing apparatus, input apparatus of a keyboard and a mouse connected to the computer main body and display apparatus of display and the like. Further, the terminal computer 9 is installed with browser software for browsing a home page on the internet or electronic mail software and can communicate with the server 10.

The tank trolley 8 as fuel delivery means is a vehicle for circulating locations of the construction machines 1, 2 and supplying light oil constituting fuel to each construction machine 1, 2. The tank trolley 8 supplies fuel to a plurality of the construction machines 1, 2 and therefore can transport, for example, several kiloliters of light oil. The tank trolley 8 is provided with fuel feeding achievement inputting means as fuel feeding information acquiring means including a fuel supply amount which is a fuel feeding amount, a fuel feeding date and fuel enterprise specifying information, a portable information terminal apparatus including means for inputting a visual inspection result, a GPS sensor and a communication terminal, although illustration thereof is omitted.

The fuel feeding achievement inputting means is a portion of inputting fuel feeding achievement of light oil supplied from a tank of its own to the construction machine 1, 2. That is, the fuel feeding achievement inputting means is constituted to input a machine number, fuel feeding date and time of the construction machine 1 fed with fuel, the supply amount of fuel which is an amount of feeding fuel to the construction machine 1, 2 and fuel enterprise specifying information. Further, the fuel feeding amount which is the supply amount of fuel can automatically be acquired based on a signal from, for example, a flow rate sensor.

The visual inspection result inputting means inputs a result of carrying out visual inspection of the construction machine 1, 2 in supplying fuel. That is, the visual inspection result inputting means is constituted to display a check list comprising, for example, predetermined items of presence or absence of leakage of oil, presence or absence of crack of an operating machine and the like and to expedite a driver of the tank trolley 8 to input the items.

The GPS sensor similar to those mounted to the construction machines 1, 2 is adopted. The GPS sensor is provided with a navigation function capable of displaying by a map, present position information of the tank trolley 8 on a display portion of the portable information terminal apparatus.

The communication terminal outputs current position information of the tank trolley 8 acquired by the GPS sensor, fuel feeding achievement information inputted by the fuel feeding achievement inputting means and visual inspection result inputting means and visual inspection result information to the server 10 via a wireless medium. As the communication terminal, for example, a portable information terminal apparatus of PDA (Personal Digital Assistant) or the like connectable to a public wireless network of a portable telephone or the like, can be adopted. Further, the communication terminal can be constituted to be able to transmit and receive signals via the communication satellite 4 similar to the construction machine 1, 2.

Figure 3:
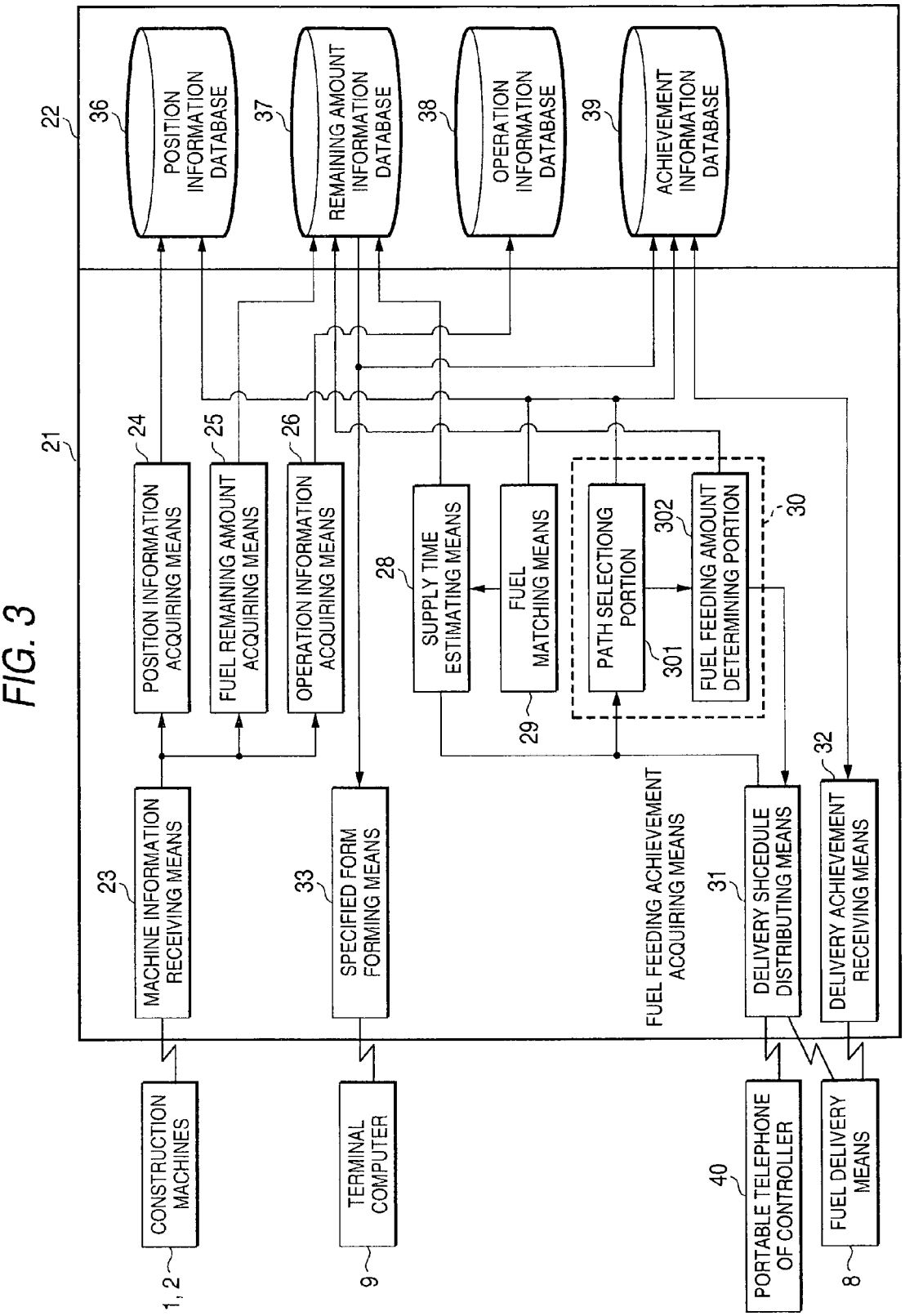
FIG. 3 is a block diagram showing a structure of a server constituting a system according to the embodiment.

The server 10 is constituted as a WWW (World Wide Web) server connected to the network 7. As shown by, for example, FIG. 3, the server 10 is provided with an operational processing apparatus 21 for executing various programs and a storing apparatus 22 of a hard disk or the like for storing transmitted or received information.

The operational processing apparatus 21 is provided with machine information receiving means 23, position information acquiring means 24, fuel remaining amount acquiring means 25 as means for acquiring information of a fuel remaining amount, operation information acquiring means 26, supply time estimating means 28, fuel matching means 29, delivery schedule forming means 30, delivery schedule distributing means 31, delivery achievement receiving means 32 as fuel feeding achievement acquiring means and specified form forming means 33 as programs developed on OS (Operating System) for executing operational control of a total of the server 10 including the operational processing apparatus 21.

The storing apparatus 22 is provided with a position information data base 36, a remaining amount information data base 37, an operation information data base 38 and an achievement information data base 39 for accumulating information inputted and outputted by the above-described respective means 23 through 34. Other than these, an area of storing programs including the respective means 23 through 34 and OS is also provided.

The machine information receiving means 23 is a portion for receiving position information and machine information including the fuel remaining amount and operation information outputted from the communication terminal 14 of each construction machine 1, 2. The received machine information is related to a machine number and outputted to the position information acquiring means 24, the fuel remaining amount acquiring means 25 and the operation information acquiring means 26.

Further, the machine information can be acquired by various methods. For example, there are exemplified methods of acquiring the machine information via a wireless medium, by outputting an information signal of detecting the fuel remaining amount by various sensors by wireless and receiving the information by the terminal computer 9 installed at a control office of a construction site where the construction machine 1, 2 is operated, acquiring an information signal outputted from the terminal computer 9 via the network 7 of the internet or the like, or outputting sensor information by a portable mobile communication apparatus 40 of a portable telephone or PHS (Personal Handyphone System) by wireless.

The position information acquiring means 24 is a portion of acquiring position information of the construction machine 1, 2. The position information acquiring means 24 forms the position information by corresponding the machine number of the construction machine 1, 2 constituting an object to latitude information and longitude information from the machine information and outputs the position information to the position information data base 36.

The fuel remaining amount acquiring means 25 is a portion of acquiring the fuel remaining amounts of the construction machine 1, 2. The fuel remaining amount acquiring means 25 forms the fuel remaining amounts by corresponding the machine numbers of the construction machine 1, 2 with fuel remaining amount data and outputs the fuel remaining amount to the remaining amount information data base 37.

Further, as a constitution of acquiring the fuel remaining amount, the constitution may acquire the fuel remaining amount directly or indirectly and the operation can be carried out any of methods of acquiring the remaining amounts directly from fuel remaining amount sensors, not illustrated, of the construction machine 1, 2, and calculating the fuel consumption of the construction machine 1, 2, predicting the fuel consumption amount from operation time period of the construction machine 1, 2 and acquiring the fuel remaining amount by subtracting the fuel consumption amount from a fuel tank capacity.

The operation information acquiring means 26 is a portion of acquiring operation information of the construction machine 1, 2. The operation information acquiring means 26 forms operation information by corresponding the machine number of the construction machine 1, 2 with an operation time period and operation load of the construction machine 1, 2 and outputs the operation information to the operation information data base 38.

The supply time estimating means 28 is a portion of estimating fuel supply date and time of the construction machine 1, 2 at a next time. Specifically, the supply time estimating means 28 estimates the fuel supply date and time at the next time and imminence of supplying fuel to each construction machine 1, 2 based on the fuel remaining amount of the respective machine numbers accumulated in the remaining amount information data base 37 and the operation information for the respective machine numbers accumulated in the operation information data base 38.

The fuel matching means 29 is a portion of selecting light oil of fuel optimum for supplying to the construction machine 1, 2. Specifically, the position information of each construction machine 1, 2 accumulated in the position information data base 36, is checked with a map information data base, not illustrated, and it is determined under what area condition, a current area of operating each construction machine 1, 2 is disposed. Further, for example, normal light oil is matched to the construction machine 1, 2 the operation area of which is present at a mountain portion with comparatively less people and emulsion fuel having a small amount of nitrogen oxides in emission is matched to the construction machine 1, 2 present in an area where a caution is required to environmental contamination such as an urban area.

Figure 4:
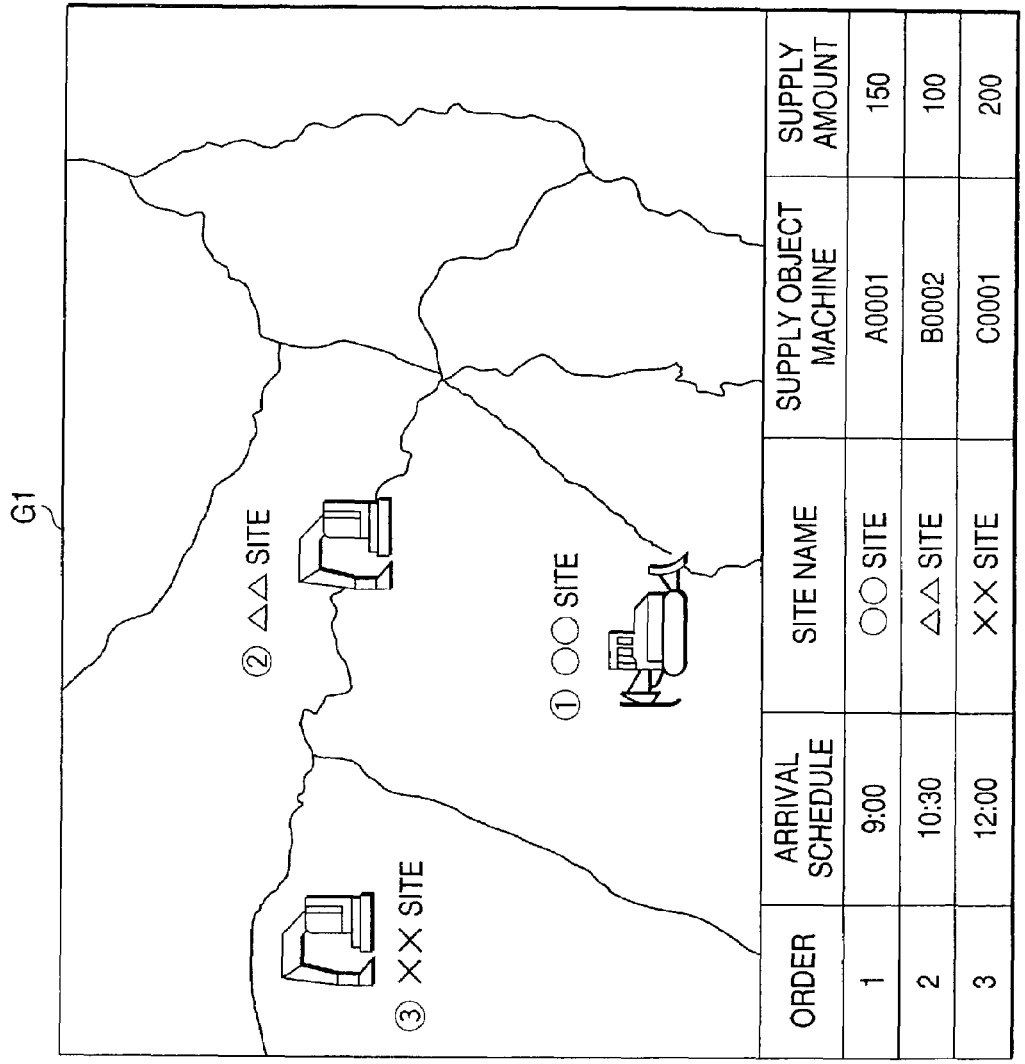
FIG. 4 is a view showing a screen image of a delivery schedule distributed by delivery schedule distributing means according to the embodiment.

The delivery schedule forming means 30 is a portion of forming a delivery schedule for delivering and supplying fuel, for example, forming a circulatory supply path to the construction machine 1, 2 which is a delivery route of the tank trolley 8 as shown in screen display of FIG. 4. The delivery schedule forming means 30 is provided with a path selecting portion 301 and a fuel feeding amount determining portion 302.

Further, the path selecting portion 301 is a portion of setting a circulatory path based on data of fuel supply date and time estimated by the supply time estimating means 28 and position information of each construction machine 1, 2 accumulated in the position information data base 36. Although a detailed description thereof will be given later, the path selecting portion 301 is constituted to set a plurality of paths and to select a path having shortest circulatory time therefrom.

Further, the fuel amount determining portion 302 is a portion of determining a total amount of light oil which is fuel loaded on the circulating tank trolley 8. The fuel feeding amount determining portion 302 determines whether a total amount of fuel supply of the construction machine 1, 2 constituting an object of supply selected by the path selecting portion 301, is sufficiently supplied by a vessel capacity of the tank trolley 8.

The delivery schedule distributing means 31 as fuel feeding information distributing means, notifies delivery information of the delivery schedule formed by the delivery schedule forming means 30, a guide expediting to set input of acknowledgement or time change of a delivery schedule shown in FIGS. 5A, 5B, 5C and 5D, or fuel price, to a controller controlling the construction machine 1, 2 by outputting the delivery information from the server 10 to the terminal computer 9 via the network 7 of the internet or the like, or outputting the delivery information by the portable mobile communication apparatus 40 of a portable telephone or PHS as shown by, for example, 5A, 5B, 5C and 5D. Further, the delivery schedule distributing means 31 distributes a determined delivery schedule to the tank trolley 8. Specifically, the delivery schedule communicating means 31 provides the delivery schedule to a portable information terminal apparatus mounted to the tank trolley 8. Further, a driver of the tank trolley 8 carries out circulatory supply to the construction machine 1, 2 based on the delivery schedule displayed on a screen of the portable information terminal apparatus.

Figure 5A:
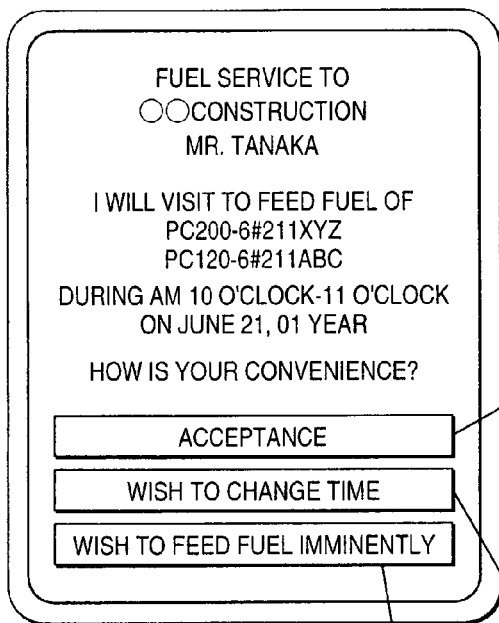
FIGS. 5A, 5B, 5C and 5D are schematic views showing a state of outputting notification of a delivery schedule to a display screen of a portable telephone according to the embodiment.
Figure 5B:
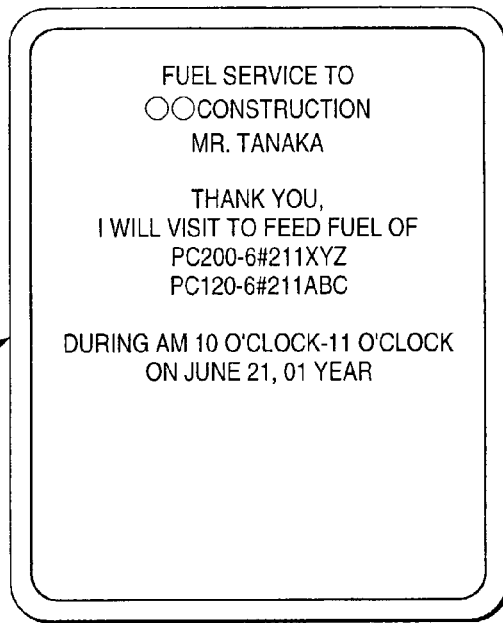
Figure 5D:
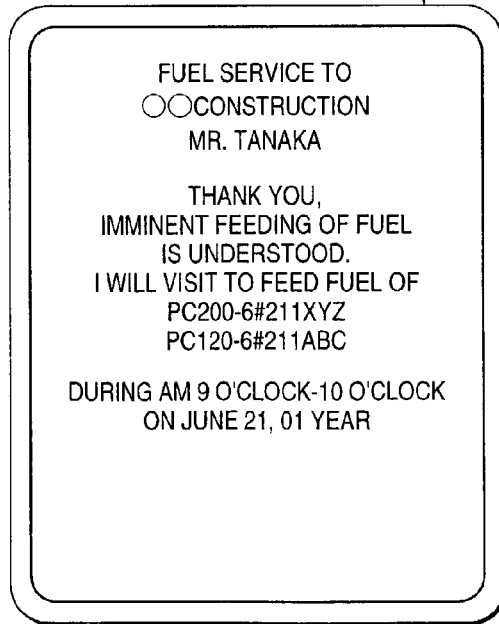
Figure 5C:
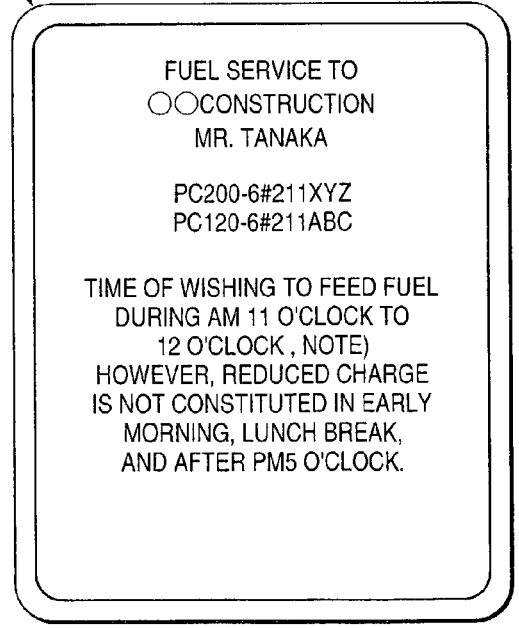

Further, according to the embodiment, as shown by, for example, FIG. 5B, when fuel is delivered by a delivery schedule for efficiently delivering fuel, fuel is supplied and fed by reduced charge and as shown by FIGS. 5C, 5D, when fuel is requested to feed imminently in a time band, for example, other than a normal delivery time band of from 12 o'clock to 13 o'clock or after 17 o'clock or other than a delivery schedule, the charge is set to general deal charge which is not reduced charge or to increased charge.

Meanwhile, the portable information terminal apparatus of the tank trolley 8 is also provided with a function of receiving a request of feeding fuel and a request of goods such as oil or a part other than light oil which is fuel transmitted from the terminal computer 9 at a construction site or the portable mobile communication apparatus 40 of the controller to the server 10. Further, the portable information terminal apparatus forms a delivery schedule by the delivery schedule forming means 30 or forms again to constitute again a delivery schedule already formed in response to the request of feeding fuel. Further, when there is a request of an article other than the goods, the driver procures the article in response to the request and delivers the article to the respective construction sites in circulatory supply.

The delivery achievement receiving means 32 is a portion of receiving a result of circulatory supply by the tank trolley 8 based on the distributed delivery schedule. Fuel feeding achievement information including fuel feeding date, a number of a machine of feeding fuel and a supply amount of fuel and fuel enterprise specifying information specifying an enterprise selling fuel to be fed, constituting received delivery achievement, is accumulated to the achievement information data base 39. Further, communication between the server 10 and the portable information terminal apparatus of the tank trolley 8 is carried out via the public telephone network of a portable telephone or the like or the communication satellite 4 as described above.

The specified form forming means 33 is a portion of forming a specified form for requesting an expense of fed fuel and expense with regard to a delivered article to the controller of the construction machine 1, 2 who is a demanding person. The specified form can be obtained by the terminal computer 9 via, for example, the network 7. Further, the specified form is accumulated in the achievement information data base 39. Further, the specified form forming means 33 functions as fed fuel information acquiring means for recognizing the fed fuel information, that is, that the fuel has been supplied, from a fuel remaining amount history before feeding fuel and the fuel remaining amount acquired by the fuel remaining amount acquiring means 25 after feeding fuel. Further, the specified form forming means 33 checks fuel feeding achievement information which is fuel feeding information from the fuel feeding achievement inputting means of the tank trolley 8, with the acquired fed fuel information, that is, calculates an amount of feeding fuel based on fuel feeding achievement information to the construction machine 1, 2 where feeding of fuel has been recognized and the fuel price and integrates the information to a predetermined form to thereby form the specified form.

Meanwhile, the position information data base 36 is a portion of accumulating current operation position information of each construction machine 1, 2. As shown by FIG. 6, the position information data base 36 is constituted as a data base of a table structure recorded with latitude information and longitude information of the construction machine 1, 2 in accordance with the machine number acquired by the position information acquiring means 24 as a single record. Each record is updated at each time of acquiring the record by the position information acquiring means 24 and also as shown by FIG. 6, each of the record is provided with fields for recording updated date and updated time other than the machine number and the position information.

The remaining amount information data base 37 is a portion for accumulating the remaining amount of fuel in a fuel tank of each construction machine 1, 2. As shown by FIG. 7, the remaining information data base 37 is a data base comprising a plurality of tables set with tables 351, 352, 353 . . . in accordance with the machine number acquired by the fuel remaining amount acquiring means 25. In each of the tables 351, 352, 253 . . . the fuel remaining amount acquired at the respective time is recorded as a single record and the history of the fuel remaining amount is accumulated.

Figure 8:
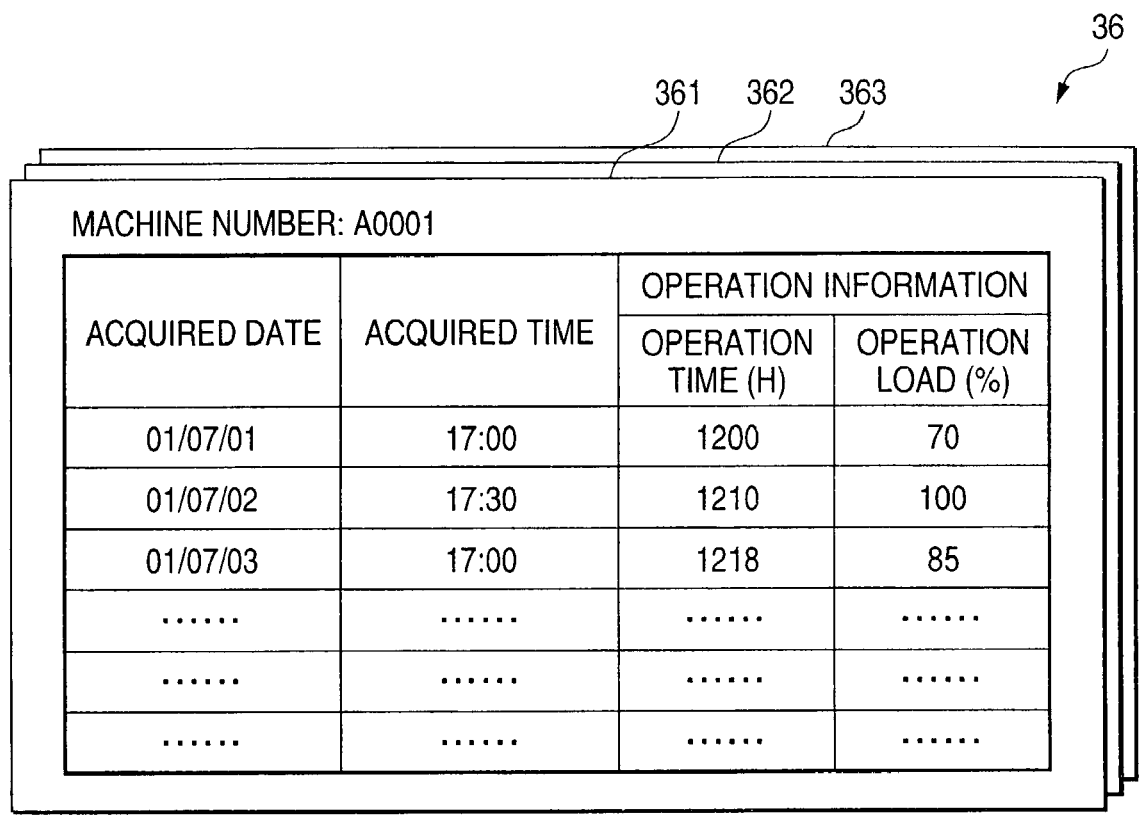
FIG. 8 is a schematic view showing a structure of a data base accumulating acquired operation information of a construction machine according to the embodiment.

The operation information data base 38 is a portion of accumulating operation information of each construction machine 1, 2. As shown by FIG. 8, similar to the remaining amount information data base 37, the operation information data base 38 is a data base comprising a plurality of tables set with tables 361, 362, 363 . . . in accordance with the machine number acquired by the operation information acquiring means 26. Each of the tables 361, 362, 363 . . . is recorded with operation information acquired at each time as a single record and history of operation information is accumulated for each of the tables 361, 362, 363 . . . . Further, according to the example, as the operation information, accumulated operation time and operation load in acquiring the operation information are recorded.

The achievement information data base 39 is a portion of accumulating fuel feeding achievement information in circulatory supply of the tank trolley 8. As shown by FIG. 9, the achievement information data base 39 is a data base comprising a plurality of tables set with tables 371, 372, 373 . . . in accordance with a number of the circulating tank trolleys 8. Each of the tables 371, 372, 373 . . . is recorded with supply achievement in accordance with the machine number of the construction machine 1, 2 constituting the object of supply as a single record. Specifically, each of the record is recorded with circulating date, supply start time, supply finish time, fuel kind, light oil remaining amount in a trolley vessel and a tank remaining amount and a supply amount of the construction machine 1, 2.

(Operation of System)

Next, an explanation will be given of operation of the fuel delivery system 100 of the machine. Further, in the following explanation, the server 10 individually acquires and accumulates position information from the plurality of construction machines 1, 2, the fuel remaining amount, and the operation information, estimate the fuel supply time, form and distribute the fuel delivery schedule, accumulate the achievement information and form the specified form and therefore, an explanation will be given of the respective processings.

Figure 10:
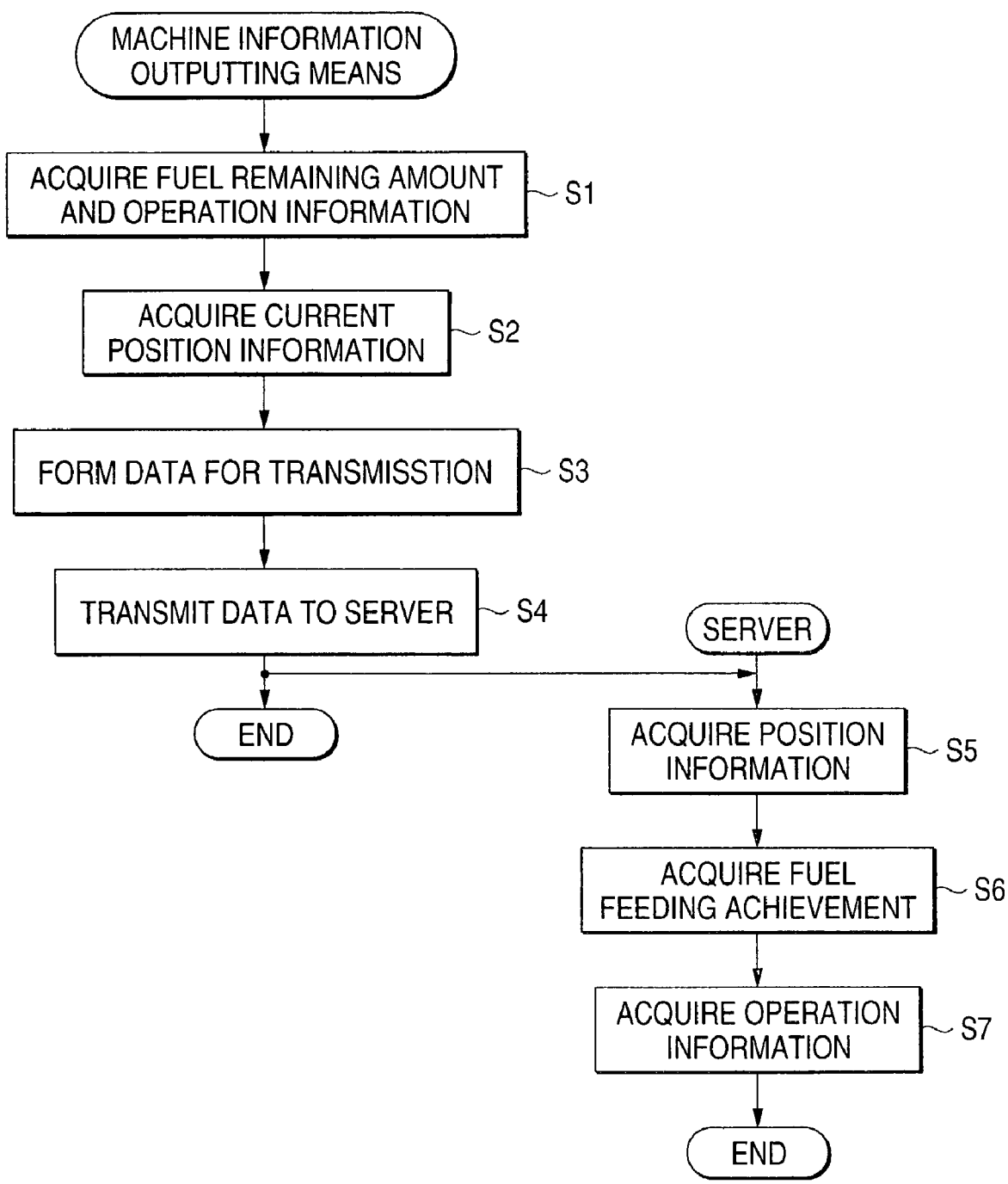
FIG. 10 is a flowchart for explaining operation of the embodiment.

(1) Acquisition and Accumulation of the Position Information, the Fuel Remaining Amount and the Operation Information The position information, the fuel remaining amount and the operation information are acquired and accumulated based on a flowchart shown in FIG. 10.

First, the communication controller 12 mounted to the construction machine 1, 2, acquires the fuel remaining amount and the operation information including the operation time period and the operation load based on the signals from various kinds of sensors (processing S1). Next, the communication controller 12 acquires current position information of the construction machine 1, 2 from the GPS sensor 13 (processing S2).

Further, the communication controller 12 forms data for transmission by combining the acquired fuel remaining amount and operation information and the current position information with the machine number of the construction machine 1, 2, acquired date and acquired time (processing S3). Thereafter, the data for transmission is transmitted to the server 10 via the communication satellite 4, the satellite earth station 5 and the network control station 6 (processing S4). Further, although timing of transmission may be constituted by time of starting operation of the day and the data of preceding day may be transmitted to the server 10, data of the day may be transmitted to the server 10 at time of finishing operation of the day.

The machine information receiving means 23 of the server 10 receives transmission data including the machine information transmitted from each construction machine 1, 2 and outputs the transmission data to the position information acquiring means 24, the fuel remaining amount acquiring amount 25 and the operation information acquiring means 26. Further, the position information acquiring means 24 acquires current position information of each construction machine 1, 2 from the transmission data (processing S5: position information acquiring procedure) and accumulates the current position information to the position information data base 36.

Further, the fuel remaining amount acquiring means 25 acquires the fuel remaining amount of each construction machine 1, 2 from the transmission data (processing S6: fuel remaining amount acquiring procedure) and accumulates the fuel amount to the remaining amount information data base 37.

Further, the operation information acquiring means 26 acquires the operation information including the operation time and the operation load of each construction machine 1, 2 from the transmission data (processing S7: operation information acquiring procedure) and accumulates the operation information to the operation information data base 36.

In this way, the embodiment is constituted to output the position information, the fuel remaining amount and the operation information of the construction machines 1, 2 via a wireless medium by the communication controller 12 mounted to each construction machine 1, 2. Therefore, the position information, the fuel remaining amount and the operation information of the construction machine 1, 2 can automatically be acquired without interposing manual labor and time and efficient formation of collecting information of the system can be achieved. Further, by utilizing the communication satellite 4, even when the construction machine 1, 2 carries out operation at a mountain portion or the like, the information can firmly be collected.

Figure 11:
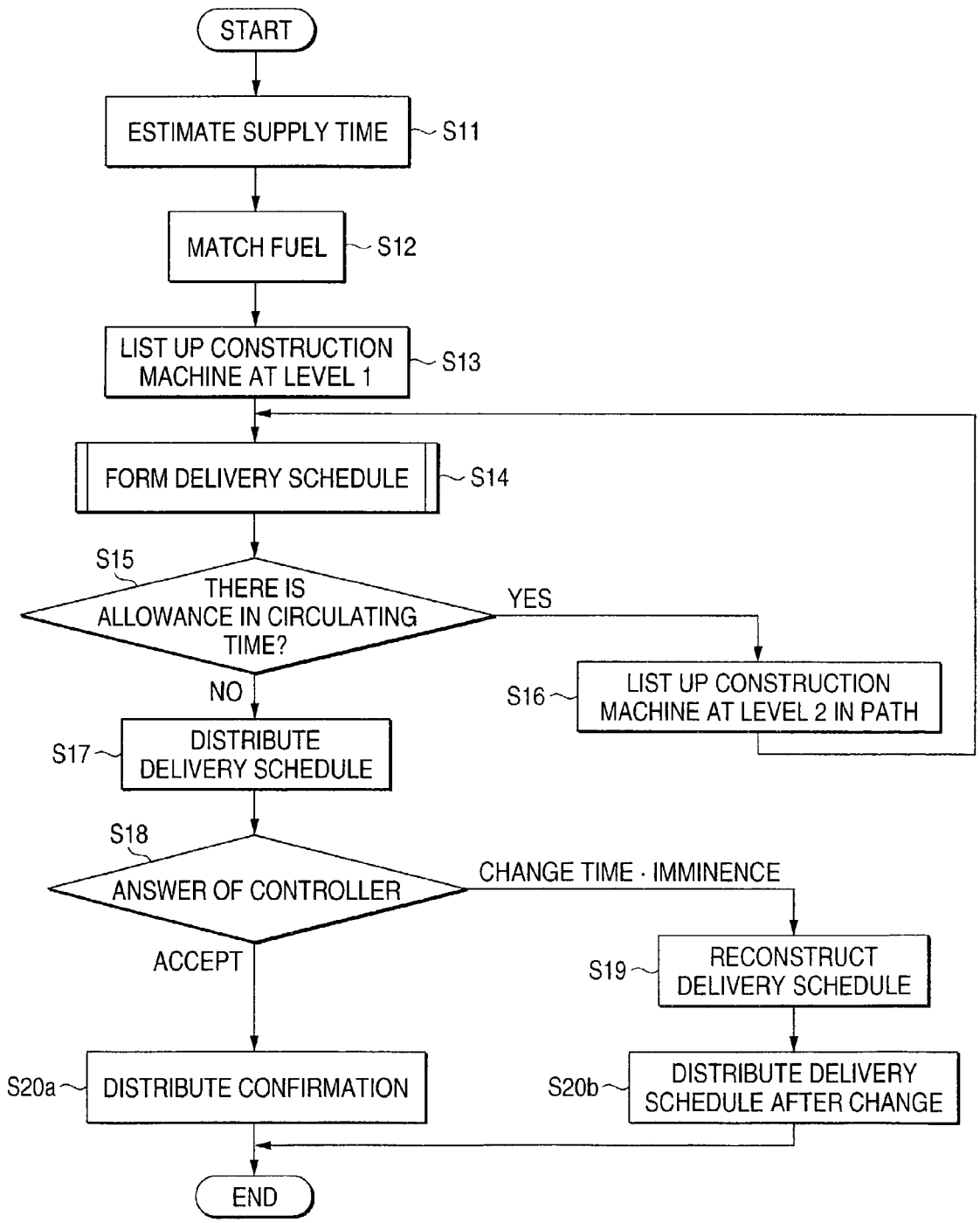
FIG. 11 is a flowchart for explaining operation of the embodiment.

(2) Estimation of the Fuel Supply Time and Formation and Distribution of the Delivery Schedule The time of supplying fuel to each construction machine 1, 2 is estimated and the delivery schedule is formed and distributed based on a flowchart shown in FIG. 11 by utilizing data of the position information data base 36 and the remaining amount information data base 37 accumulated at the above-described respective procedures S5 through S7. The delivery schedule is formed in accordance with the tank trolley 8 and in forming the delivery schedule, a kind of fuel supplied to each tank trolley 8 is determined and the fuel supply time is estimated based on the imminence of supplying fuel to the construction machine 1, 2.

First, the supply time estimating means 28 estimates fuel supply time of each construction machine 1, 2 in accordance with the fuel remaining amount of each construction machine 1, 2 accumulated in the remaining information data base 37 (processing S11: supply time estimating procedure). The fuel supply time is estimated based on a change in the fuel remaining amount accumulated in the remaining amount information data base 37, for example, the remaining amount is ranked in accordance with the imminence of supply such that the fuel remaining amount which needs supply of fuel within one day is ranked as level 1, the remaining amount which needs supply of fuel within two days, is ranked as level 2 and the remaining amount which needs supply of fuel in three days or more, is ranked as level 3.

Next, the fuel matching means 29 matches fuel in accordance with an area condition of each construction machine 1, 2 based on the position information of each construction machine 1, 2 accumulated in the position information data base 36 (S12: fuel matching procedure). Further, when a portion of the construction machine 1, 2 constituting the object of supply, must use different fuel, the fuel matching means 29 is integrated to a delivery schedule separately formed by different fuel. Further, an estimated result of the supply time estimating means 28 is outputted to the path selecting portion 301 of the delivery schedule forming means 30.

Figure 12:
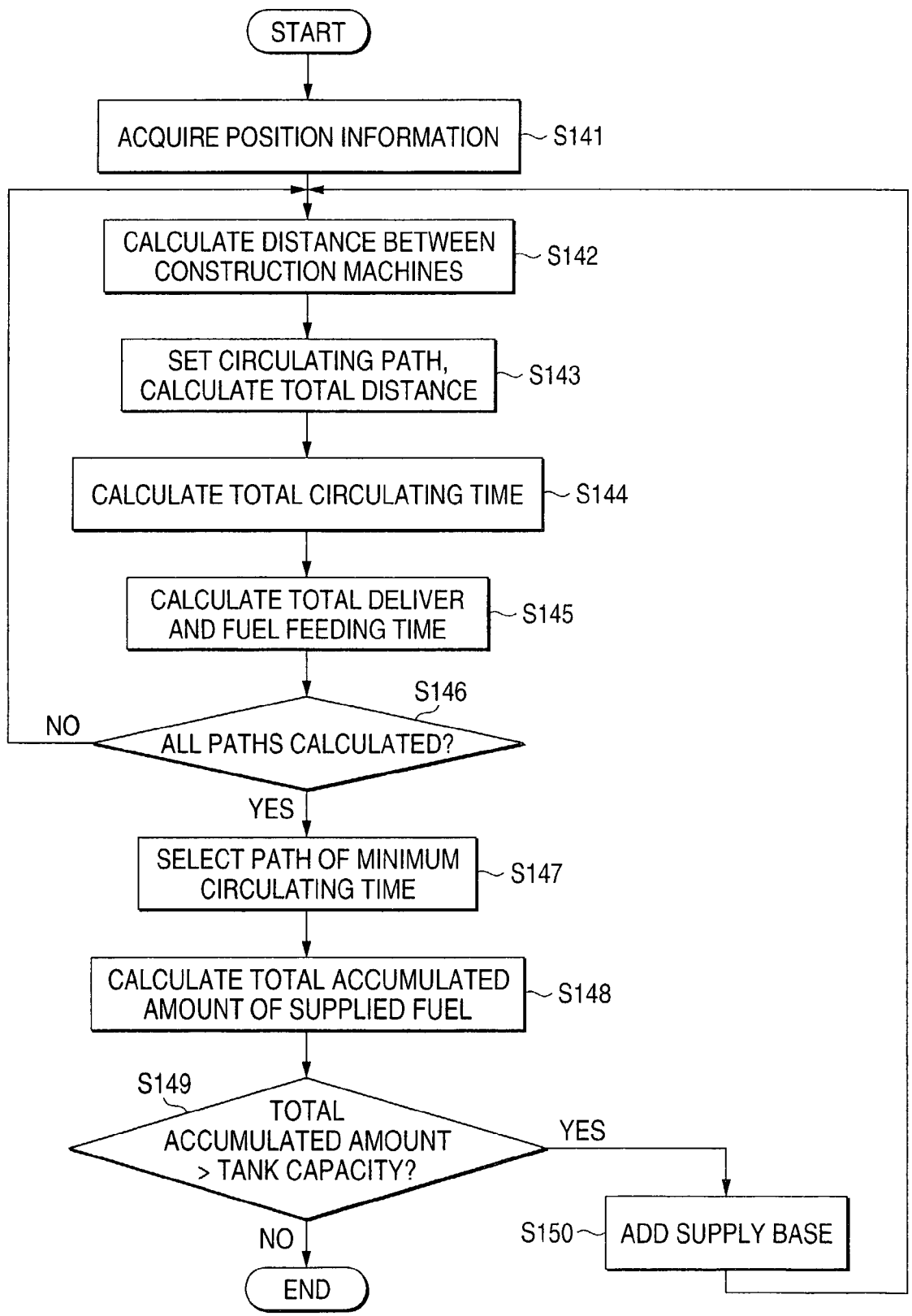
FIG. 12 is a flowchart for explaining operation of the embodiment.

The path selecting portion 301 of the delivery schedule forming means 30 firstly lists up the construction machine 1, 2 estimated to be at level 1 by the supply time estimating means 28 (processing S13) and forms a delivery schedule (processing S14: delivery schedule forming procedure). Here, a specific delivery schedule is formed based on a flowchart shown in FIG. 12.

First, the path selecting portion 301 acquires the respective position information of the listed up construction machine 1, 2 (processing S141). Further, the path selecting portion 301 calculates a distance between the machines based on the acquired position information of each construction machine 1, 2 (processing S142).

Next, the path selecting portion 301 sets a path for circulating respective positions and calculates a total distance based on information of the map information data base (not illustrated) used also in fuel matching (processing S143). Further, total time required for circulation is calculated from the total distance (processing S144). The circulating time is calculated by calculating average hour speed in accordance with the path from information accumulated in the achievement information data base 39 produced by accumulating achievement information, mentioned later, and dividing the total distance by the average hour speed.

Further, the path selecting portion 301 acquires a fuel feeding time period per piece of each construction machine 1, 2 from the achievement information data base 39 and calculates a total of the delivery fuel feeding time period by adding the total fuel feeding time period produced by multiplying the fuel feeding time period per piece by a number of pieces of the circulating construction machines 1, 2 to a total circulating time period (processing S145). Further, the path selecting portion 301 calculates the total of the delivery fuel feeding time period with respect to all of combinable paths (processing S146) and selects a path minimizing the delivery fuel feeding time period (processing S147).

When the minimized path is selected by the path selecting portion 301, the fuel amount determining portion 302 calculates a total accumulated amount of fuel light oil supplied to each construction machine 1, 2 based on the fuel remaining amount accumulated in the remaining amount information data base 37 (processing S148). Further, the fuel amount determining portion 302 determines whether the total accumulated amount is larger than the tank capacity of the tank trolley 8 (processing S149).

When the total accumulated amount of the fuel light oil is larger than the tank capacity, the path selecting portion 301 adds position information of a supply base for supplying light oil in the midst of circulation in setting a condition of selecting the path (processing S150) and sets a path and calculates the delivery fuel feeding time period again to thereby select a path minimizing the delivery fuel feeding time period. Meanwhile, when the total accumulated amount of fuel light oil is smaller than the tank capacity of the tank trolley 8, the selected path is integrated to the delivery schedule as an optimum path.

Referring back to FIG. 11, when the delivery schedule of the construction machine 1, 2 at level 1 listed up in this way, is formed, the path selecting portion 301 determines whether there is an allowance in the circulating time period by comparing the predicted delivery fuel feeding time period of the tank trolley 8 with working hours of the driver (processing S15). Further, when it is determined that there is an allowance in the circulating time period, the path selecting portion 301 lists up the construction machine 1, 2 at level 2 present in the circulating path based on the construction machine 1, 2 at level 1 and forms again the delivery schedule by adding the construction machine 1, 2 at level 2 (processing S16).

When the delivery schedule is formed as described above, the delivery schedule distributing means 31 notifies to distribute the formed delivery schedule to the terminal computer 9 of the controller or the portable mobile communication apparatus 40 (processing S17: delivery schedule distributing procedure).

Further, the notified controller confirms the delivery schedule and recognizes displays expediting to acknowledge the delivery schedule or input to set a change in time or request an imminent fuel feeding as shown by FIGS. 5A, 5B, 5C and 5D and pertinently set to input these. Further, the content set to input is recognized by the delivery schedule distributing means 31. When the recognized content acknowledges the distributed delivery schedule, it is distributed that fuel is delivered and fed by the delivery schedule of a content distributed as shown by, for example, FIG. 5B (processing S20a). Further, the delivery schedule distributing means 31 distributes the delivery schedule to the tank trolley 8 to thereby deliver and feed fuel.

Further, when the content set to input is a change in time, the delivery schedule is reconstructed (processing S19). Thereafter, the delivery schedule changed as shown by, for example, FIG. 5C, is distributed to notify again to the terminal computer 9 or the portable mobile communication apparatus 40 of the controller by the delivery schedule distributing means 31 (processing S20b) and the determined delivery schedule after the change is distributed to the tank trolley 8 to thereby deliver and feed fuel.

Further, when the content set to input is a request of imminently feeding fuel, the operation proceeds to the processing S19, forms a delivery schedule for feeding fuel only to the construction machine 1, 2 constituting an object of the request of imminently feeding fuel and reconstructs a delivery schedule efficient for supplying fuel to other than the construction machine 1, 2 constituting the object. Further, the operation proceeds to the processing S20b, distributes a delivery schedule changed for supplying fuel to the construction machine 1, 2 constituting the object again to the controller and distributes the delivery schedule to the tank trolley 8 as shown by, for example, FIG. 5D to fastly distribute and feed oil to the construction machine 1, 2 constituting the object. Further, the delivery schedule efficient for feeding fuel to other than the construction machine 1, 2 constituting the object is distributed to, for example, a separate tank trolley 8 and fuel is delivered and supplied based on a separate efficient delivery schedule.

In this way, according to the embodiment, by automatically carrying out the series of processings by the server 10, time of supplying fuel in accordance with an operational situation to the construction machine 1, 2 at a position determined by the acquired position information, can automatically be determined and the tank trolley 8 can efficiently be circulated and the light oil of fuel can be supplied in accordance with the fuel remaining amount of the construction machine 1, 2. Therefore, the operator of the construction machine 1, 2 can be engaged with the operation without care about the remaining amount of the maneuvering construction machine 1, 2. Further, the tank trolley 8 supplies light oil which is fuel by circulating a plurality of the construction machines 1, 2 based on the delivery schedule and therefore, time and labor of delivery by the tank trolley 8 can be alleviated, fuel light oil can efficiently be delivered and a reduction in delivery cost can be achieved.

Further, by the delivery schedule forming means 30, there is formed a delivery route having a short moving distance for delivering fuel and capable of delivering and feeding fuel by circulation in a short period of time. Therefore, even when fuel is delivered to a plurality of the construction machines 1, 2 operated at different locations, fuel can be delivered efficiently, a reduction in delivery cost is achieved and fuel can be provided inexpensively, for example, by reduced charge.

Further, by the delivery schedule forming means 30, there is formed the delivery schedule by acquiring fuel feeding request information of a time band requested from the controller controlling the construction machine 1, 2 or imminent feeding of fuel and therefore, other than automatic fuel delivery based on the operational situation, the fuel remaining amount and the position of the construction machine 1, 2, a request of feeding fuel from the controller for controlling the construction machine 1, 2 can be met, a performance of dealing with delivery of fuel can be promoted and a general purpose performance can be promoted.

Further, by the delivery schedule distributing means 31, there is distributed delivery information having a content enabling or expediting the operator to acknowledge the delivery schedule of fuel or to input a request of change to the controller via a wireless medium and the content input by the controller is recognized as the fuel feeding request information by the delivery schedule forming means 30 via a wireless medium. Therefore, the delivery schedule is notified to the controller of the construction machine 1, 2 via the wireless medium and acknowledgement or request of change of the delivery schedule is confirmed, and therefore, delivery of fuel can be confirmed without a difference in time.

By the delivery schedule forming means 30, the delivery schedule is reconstructed based on the fuel feeding request information from the controller recognizing the delivery schedule. Therefore, fuel can be delivered and fed efficiently in correspondence with a convenience of fuel feeding time such that fuel is delivered to feed in conformity with nonoperational time of the construction machine 1, 2.

Further, by the delivery schedule distributing means 31, the delivery schedule of fuel formed by the delivery schedule forming means 30 is distributed to the operator or controller of the construction machine 1, 2. Therefore, delivery time for supplying fuel can previously be notified to the controller and fuel can be fed smoothly.

(3) Accumulation of Achievement Information

Figure 13:
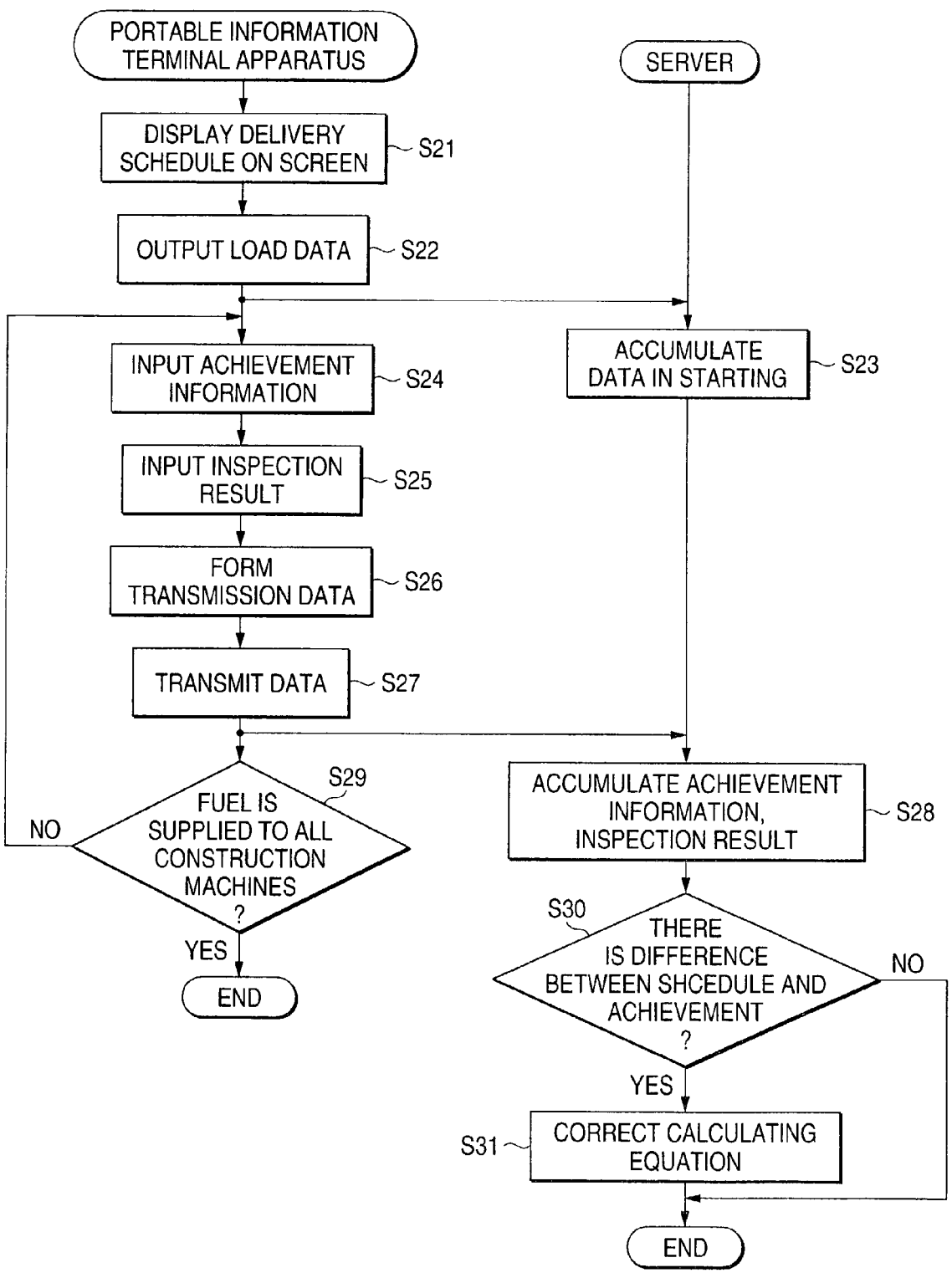
FIG. 13 is a flowchart for explaining operation of the embodiment.

Accumulation of the achievement information by the tank trolley 8 is carried out based on a flowchart shown in FIG. 13.

Distribution of the delivery schedule by the server 10 is carried out at time of staring the circulating operation of the day of the tank trolley 8. The distributed delivery schedule is displayed on the display portion of the portable information terminal apparatus of the tank trolley 8 as screen G1 as shown by, for example, FIG. 4 (processing S21).

After supplying light oil as fuel to the tank based on the delivery schedule displayed on screen G1, the driver of the tank trolley 8 inputs an amount of light oil in the vessel and outputs data combined with circulating date, supply start time and the kind of fuel to the server 10 via a wireless medium by operating the portable information terminal apparatus (processing S22) to thereby start circulation. The delivery achievement receiving means 32 of the server 10 receives the data and records the data to the achievement information data base 39 as data in starting the circulatory supply (processing S23). Further, the fuel feeding amount can be input via the wireless medium.

The driver arrives at a construction site included in the delivery schedule and supplies fuel light oil to the construction machine 1, 2. In feeding fuel, the fuel feeding achievement information including the machine number of the construction machine 1, 2, the fuel feeding date and time, the fuel feeding amount and the fuel enterprise specifying information, is inputted by functioning the fuel supply inputting means on the portable information terminal apparatus (processing S24).

Further, although the fuel feeding achievement information may be inputted manually by the driver, when a bar code or the like representing the machine number is pasted on the construction machine 1, 2 to be controlled and the bar code is read by the portable information terminal apparatus, the inputting operation can be alleviated. Further, the fuel feeding achievement information may be recognized by the server 10 via the wireless medium by operating a switch recognizing the fuel feeding operation. Further, the fuel supply amount may be automatically read from a fuel feeding amount sensor of the tank trolley 8.

Next, the driver makes the visual inspection result inputting means function on the portable information terminal apparatus, executes visual inspection of the construction machine 1, 2 supplied with fuel light oil and inputs a result of the inspection (processing S25).

After acquiring the fuel feeding achievement information and the visual inspection result, the driver forms transmission data (processing S26) and outputs the fuel feeding achievement information and the visual inspection result to the server 10 via the wireless medium (processing S27) by operating the portable information terminal apparatus. The delivery achievement receiving means 32 of the server 10 receives the transmitted achievement information and visual inspection result and records the achievement information to the achievement information data base 39 and the visual inspection result to a maintenance data base illustration of which is omitted in FIG. 3 (processing S28).

The processings are repeated at each supply of fuel light oil to the construction machine 1, 2 included in the delivery schedule and carried out until supplying the fuel light oil to all of the construction machines 1, 2 is completed (processing S29).

After accumulating the achievement information from the tank trolley 8 in the achievement information data base 39, the delivery schedule forming means 30 compares the delivery fuel feeding time period and the fuel supply amount predicted in the formed delivery schedule with the actual delivery fuel feeding time period and the actual fuel supply amount included in the achievement information and determines whether there is a difference between the delivery schedule and the achievement (processing S30). When it is determined that there is a large difference between the delivery schedule and the achievement, the delivery schedule forming means 30 corrects an equation of a method of calculating an optimum delivery route used in forming the delivery schedule to be proximate to the achievement (processing S31).

By recording achievement information on the achievement information data base 39 in this way, the actual action of the tank trolley 8 based on the delivery schedule, can be fed back; and therefore, by calculating predicted average speed, predicted fuel feeding time period and predicted fuel feeding amount from the achievement information, a delivery schedule thereafter can be formed and the delivery schedule can be provided with high accuracy more adapted to the actual state.

Further, by making the driver of the tank trolley 8 execute visual check in feeding fuel, an abnormality of a portion which cannot be detected by the sensors of the construction machine 1, 2 can be obtained and therefore, even when the construction machine 1, 2 is present at a remote location, the state of the construction machine 1, 2 can be determined and efficient formation of maintenance can be achieved.

(4) Formation of Specified Form

The specified form for requesting expenses, which are required for delivering fuel or delivering an article, is formed based on a flowchart shown in FIG. 14.

When fuel finishes supplying to the construction machine 1, 2, the specified form forming means 33 acquires a history of the fed fuel remaining amount from the remaining amount information data base 37 with regard to the construction machine 1, 2 (processing S41). Further, the specified form forming means 33 confirms that the fuel has been supplied from, for example, the acquired fuel remaining amount history of the construction machine 1, 2 to which the fuel has been fed and the fuel remaining amount acquired by the fuel remaining amount acquiring means 25 after fuel has been fed (processing S42).

Further, the specified form forming means 33 acquires the fuel feeding achievement information including the fuel feeding date and time, the fuel supply amount and whether fuel is delivered at reduced charge, that is, fuel price and fuel enterprise specifying information from the tank trolley 8 (processing S43) and forms the specified form for requesting expenses of feeding fuel and an article delivered in feeding fuel by integrating the specified form to a predetermined form based on the fuel feeding achievement information and the number of the construction machine 1, 2 in which fuel has been confirmed to feed (processing S44). The formed specified form is read by the terminal computer 9 via, for example, the network 7 and outputted by predetermined setting operation of the terminal computer 9 and printed from, for example, a printing apparatus (processing S45). Further, the style of the specified form is accumulated in, for example, the achievement information data base 39.

In this way, the specified form for requesting expense of fuel confirmed to be fed and fed based on the fuel feeding achievement is automatically formed, and therefore, operation of requesting expense of fed fuel can be simplified.

MODIFICATION OF EMBODIMENT

Further, the invention is not limited to the above-described embodiment but includes modifications shown below in the range capable of achieving the object of the invention.

That is, although an explanation has been given by exemplifying the construction machine 1, 2 as the machine, the invention can be carried out by any machine operated by consuming fuel, for example, a heating apparatus such as burner for burning or drying, a generator, an agricultural machine, a ship or a vehicle on rail.

Further, the delivery schedule formed by the delivery schedule forming means 30, may simply be constituted by the delivery route and the delivery route may be constituted in which a moving distance or time is not investigated. Further, the delivery route may be formed by acquiring, for example, fuel feeding request information from the controller and is not limited to the constitution of reconstructing the delivery schedule based on the fuel feeding request information from the controller.

Further, although the delivery schedule is distributed to the controller, there may be constructed a constitution of notifying the delivery schedule of delivery time or the like manually by utilizing a separate telephone network.

Further, although the specified form for requesting expense is formed, the specified form may be issued separately by subjecting the specified form manually to an accounting processing.

Further, although the machine information acquired by the construction machine 1, 2 is constituted to output to the server 10 via the communication satellite 4, the satellite earth station 5 and the network control station 6, the invention is not limited thereto. That is, as described above, the machine information may be outputted by wireless by utilizing the public network of PHS or the like and the machine information outputted by wireless may be constituted to receive by the terminal computer 9 at a construction site and outputted from the terminal computer 9 to the server 10 via the network 7.

Further, although there is adopted the portable information terminal apparatus mounted to the tank trolley 8 connectable to the public wireless network such as a portable telephone, as described above, similar to outputting the machine information from the construction machine 1, 2, exchange of information with the server 10 may be constituted to carry out via the communication satellite 4.

Further, although confirmation of feeding fuel light oil is calculated from the fuel remaining amount of the construction machine 1, 2, the confirmation can be carried out by any method such as a method of confirming fuel feeding based on, for example, a sensor recognizing filling up of the tank, a switch opened and closed in feeding fuel and the fuel feeding achievement information.

Further, although an explanation has been given of the visual inspection in feeding fuel, the visual inspection may not be carried out but only the fuel is fed and a constitution of delivering other article may not be included.

Other than these, the specific structure and procedure in executing the invention may be constituted by other structure and the like within the range capable of achieving the object of the invention.

What is claimed is:

1. A fuel delivery system for forming a delivery schedule for supplying fuel to a machine, the fuel delivery system comprising:
    position information acquiring means for acquiring position information of the machine;
    operation information acquiring means for acquiring operation information of the machine;
    fuel remaining amount information acquiring means for acquiring remaining amount information of the fuel of the machine;
    fuel feeding time estimating means for estimating fuel feeding time of the fuel of the machine based on the operation information acquired by the operation information acquiring means and the remaining amount information of the fuel acquired by the fuel remaining amount information acquiring means; and
    delivery schedule forming means for forming the delivery schedule for delivering the fuel to the machine based on the fuel feeding time acquired by the fuel feeding time estimating means and the position information acquired by the position information acquiring means to the machine, for permitting a human controller of the machine to accept the delivery schedule, and for permitting a human controller of the machine to modify the delivery schedule.

2. The fuel delivery system according to claim 1, wherein the delivery schedule forming means forms a delivery route based on shortening moving distances and time periods for delivering the fuel.

3. The fuel delivery system according to claim 1, wherein the delivery schedule forming means forms the delivery schedule by acquiring fuel feeding request information from the human controller of the machine.

4. The fuel delivery system according to claim 1, further comprising:
fuel feeding information distributing means for distributing the delivery schedule of the fuel to the human controller of the machine.

5. The fuel delivery system according to claim 4,
wherein the fuel feeding information distributing means distributes delivery information having a content enabling the human controller to input an acknowledgement and to request a change in the delivery schedule of the fuel to the human controller via a wireless medium; and
wherein the delivery schedule forming means recognizes the content input by the human controller as the fuel feeding request information via a wireless medium.

6. The fuel delivery system according to claim 4, wherein the delivery schedule forming means reconstructs the delivery schedule based on the fuel feeding request information from the human controller recognizing the delivery schedule.

7. The fuel delivery system according to claim 1, further comprising:
fed fuel information acquiring means for acquiring fed fuel information with regard to feeding the fuel from the machine constituting an object to be fed with the fuel; and
fuel feeding information acquiring means for acquiring fuel feeding information with regard to feeding the fuel to the machine;
wherein the delivery schedule forming means recognizes a fuel feeding amount and a fuel price of the fuel by checking the fed fuel information acquired by the fed fuel information acquiring means with the fuel feeding information acquired by the fuel feeding information acquiring means and forms a specified form for requesting an expense produced by feeding the fuel based on the fuel feeding amount and the fuel price of the fuel.

8. A fuel delivery method for forming a delivery schedule for feeding fuel to a machine, the fuel delivery method comprising the steps of:
acquiring position information and operation information of the machine and remaining amount information of the fuel by a computer;
estimating fuel feeding time of the fuel of the machine based on the operation information and the remaining amount information of the fuel by the computer;
forming the delivery schedule for delivering the fuel to the machine based on the fuel feeding time and the position information and displaying the delivery schedule on a screen; and
permitting a human controller of the machine to accept and modify the delivery schedule.

9. The fuel delivery method according to claim 8, wherein the computer forms a delivery route based on shortening moving distances and time periods for delivering the fuel.

10. The fuel delivery method according to claim 8, wherein the computer forms delivery information by acquiring fuel feeding request information from the human controller of the machine.

11. The fuel delivery method according to claim 8, wherein the computer distributes the delivery information of the fuel to the human controller of the machine.

12. The fuel delivery method of a machine according to claim 11,
wherein the computer distributes the delivery information having a content enabling the human controller to input an acknowledgement and to request a change the delivery schedule of the fuel via a wireless medium; and
wherein the delivery schedule forming means recognizes the content inputted by the human controller as fuel feeding request information via a wireless medium.

13. The fuel delivery method according to claim 10, wherein the computer reconstructs the delivery schedule based on the fuel feeding request information from the human controller recognizing the delivery information.

14. The fuel delivery method according to claim 8,
wherein the computer acquires fed fuel information with regard to feeding the fuel from the machine constituting an object of feeding the fuel and fuel feeding information with regard to feeding the fuel to the machine; and
wherein the computer recognizes a fuel feeding amount and a fuel price of the fuel by checking the fed fuel information and the fuel feeding information and forms a specified form for requesting an expense produced by feeding the fuel based on the fuel feeding amount and the fuel price of the fuel.

15. A fuel delivery program, wherein the fuel delivery method according to claim 8 is executed by the computer.

* * * * *